United States Patent
Rea et al.

(10) Patent No.: US 12,448,164 B2
(45) Date of Patent: Oct. 21, 2025

(54) PACKAGING METHOD AND SYSTEM TO PACK ONE OR MORE OBJECTS IN BOXES

(71) Applicant: I.M.A. INDUSTRIA MACCHINE AUTOMATICHE S.P.A., Ozzano Dell'Emilia (IT)

(72) Inventors: Dario Rea, Ozzano Dell'Emilia (IT); Fiorenzo Draghetti, Ozzano Dell'Emilia (IT); Alessandro Carapia, Ozzano Dell'Emilia (IT); Filippo Rosa, Ozzano Dell'Emilia (IT); Giacomo Collepalumbo, Ozzano Dell'Emilia (IT)

(73) Assignee: I.M.A. INDUSTRIA MACCHINE AUTOMATICHE S.P.A., Ozzano dell'Emilia (IT)

( * ) Notice: Subject to any disclaimer, the term of this patent is extended or adjusted under 35 U.S.C. 154(b) by 66 days.

(21) Appl. No.: 18/531,969

(22) Filed: Dec. 7, 2023

(65) Prior Publication Data
US 2024/0101295 A1    Mar. 28, 2024

Related U.S. Application Data (63) Continuation of application No. PCT/IT2022/050162, filed on Jun. 7, 2022.

(30) Foreign Application Priority Data

Jun. 8, 2021   (IT) .................. 102021000014867
Sep. 13, 2021   (EP) ............................. 21196338

(51) Int. Cl.
B65B 59/00   (2006.01)
B65B 5/02    (2006.01)
(Continued)

(52) U.S. Cl.
CPC ............ B65B 59/003 (2019.05); B65B 5/024 (2013.01); B65B 5/06 (2013.01); B65B 7/16 (2013.01);
(Continued)

(58) Field of Classification Search
CPC .. B65B 5/024; B65B 5/06; B65B 7/16; B65B 35/30; B65B 59/003
See application file for complete search history.

(56) References Cited

U.S. PATENT DOCUMENTS 6,876,958 B1 * 4/2005 Chowdhury ........... G06Q 10/04
                                                       703/2
9,315,344 B1 * 4/2016 Lehmann ............... B65G 61/00
(Continued)

FOREIGN PATENT DOCUMENTS

EP         0734948       10/1996

OTHER PUBLICATIONS

1 International Search Report filed in PCT/IT2022/050162 mailed Nov. 15, 2022.

*Primary Examiner* — Lucas E. A. Palmer
(74) *Attorney, Agent, or Firm* — RANKIN, HILL & CLARK LLP (57) ABSTRACT

A packaging system to pack objects in boxes includes a supply station to supply objects of a purchase order batch, an insertion station to insert in a box a specific batch picked up from the supply station, a closing station to close the box, a storage unit configured to house a respective group of folded and flattened boxes, a forming apparatus configured to carry out both an automatic pick-up of a corresponding folded and flattened box from the storage unit, and also a subsequent automatic forming of the box starting from the picked-up folded and flattened box. The forming apparatus includes a first pick-up device and a second pick-up device respectively (Continued)

slidably mounted on the storage unit to slide along a respective linear path, the first pick-up device remaining in a shared transfer space when it moves the folded and flattened box.

4 Claims, 9 Drawing Sheets

(51) Int. Cl.
    *B65B 5/06*     (2006.01)
    *B65B 7/16*     (2006.01)
    *B65B 35/30*     (2006.01)
    *B65B 43/14*     (2006.01)
    *B65B 43/30*     (2006.01)

(52) U.S. Cl.
    CPC ............ *B65B 35/30* (2013.01); *B65B 43/145* (2013.01); *B65B 43/305* (2013.01); *B65B 2210/04* (2013.01); *B65B 2220/14* (2013.01)

(56) References Cited

U.S. PATENT DOCUMENTS

| | | | |
|---|---|---|---|
| 2003/0188511 A1* | 10/2003 | Iwamura | B65B 59/001 |
| | | | 53/136.2 |
| 2015/0139772 A1* | 5/2015 | Rapp | B65B 59/003 |
| | | | 53/381.1 |
| 2015/0324893 A1* | 11/2015 | Langen | B65B 43/145 |
| | | | 705/26.81 |
| 2018/0150793 A1* | 5/2018 | Lert, Jr. | G05B 19/41895 |
| 2019/0127099 A1 | 5/2019 | Langen | |
| 2019/0300284 A1* | 10/2019 | Peck | B65G 1/065 |
| 2020/0094997 A1* | 3/2020 | Menon | B25J 9/1697 |
| 2020/0095001 A1* | 3/2020 | Menon | B25J 9/0093 |
| 2021/0103886 A1* | 4/2021 | Sezaki | B65B 1/137 |
| 2021/0107246 A1* | 4/2021 | Stadler | B65D 5/2095 |
| 2023/0002162 A1* | 1/2023 | Chang | B65G 1/1371 |

* cited by examiner fig. 2 fig. 4 fig. 1 fig. 3 fig. 5 fig. 6 fig. 7 fig. 14a fig. 14b fig. 13a fig. 13b fig. 13c fig. 15

PACKAGING METHOD AND SYSTEM TO PACK ONE OR MORE OBJECTS IN BOXES

CROSS-REFERENCE TO RELATED APPLICATIONS

This application is a continuation of International Application Number PCT/IT2022/050162, filed Jun. 7, 2022, which claims priority to Italian Application Number 102021000014867, filed Jun. 8, 2021, and European Patent Application Number 21196338.4, filed Sep. 13, 2021, each of which are incorporated by reference in their entirety herein.

FIELD OF APPLICATION

This invention refers to a packaging method and system to pack, in an automatic, or semiautomatic manner, objects of various types and dimensions inside boxes, the dimensions of which are selected depending on the encumbrance of each batch, or set of objects, to be inserted in them. This invention may be applied, for example, but not only, for the packing of objects purchased by mail, including electronically, for example, through e-commerce.

STATE OF THE ART

Within the context of systems for the shipping of objects originating, for example, from online purchase orders, it is well known that it is necessary to insert the objects associated with a specific purchase order made by a customer into empty boxes, to then proceed with the shipping of the package to the address indicated by the customer.

Normally, since each purchase order may involve several items of different shapes and dimensions, the corresponding box must also be chosen appropriately, so that it is as small as possible, but still able to hold all the items associated with a given order.

For this reason, a plurality of types of boxes of different dimensions are usually prepared on the basis of their capacity.

Generally, a boxing station of the system is fed with both empty boxes of various types (formed starting from flattened-out boxes), and various batches of objects of different dimensions; each batch has to be inserted in an appropriate box, and each batch is made up of an individual object or groups a plurality of objects belonging to a same purchase order.

Nowadays, big e-commerce companies, in particular, need to manage and process many thousands of purchase orders a day. Consequently, each boxing station must have a high level of productivity and flexibility and each boxing operation, including the selection of the adequate box, must be made as quickly as possible. Moreover, an optimization of the use of the volume of the box must be maintained, both to reduce the consumption of packaging material and to make transportation more efficient. In some solutions, the most appropriate box format is selected by the operator or suggested to the operator by a visual system, for example, through video instructions.

Normally, in a boxing station, an opportunely instructed operator will first select a cardboard box having an adequate format from among a plurality of cardboard boxes having various standardized dimensions. These cardboard boxes generally have four consecutive panels, connected by folding lines, four bottom flaps (to create a bottom) and four top flaps (to create a top lid). Moreover, these cardboard boxes are typically supplied flattened. The operator then proceeds to the forming of the related box, first creating the bottom, then manually inserting a batch of objects associated with a specific purchase order into the box with the upper side open, and lastly they provide to close the top of the box, by folding the four top flaps, so that each batch of objects is contained in the most appropriate box. After which, the box packaging with the batch of objects inside is sent to a storage and/or shipping station.

At the same time, another operator prepares the individual batches of objects, each corresponding to a specific purchase order, and they make them available to the boxing station operator.

A disadvantage in the preparation of the box is that, when done manually, it requires more time than the time used to prepare a new batch to be boxed.

Therefore, in prior art there are automatic systems for preparation of the boxes in an automatic manner with the help of robots, but these automatic systems often require ample available space, are complex and require adequate safety systems if an operator is in the vicinity.

Furthermore, these prior art systems start from cardboard sheets that have to be cut to shape in order to have the desired dimension, and then be manipulated to create the box.

This procedure requires bonding substances to keep the walls of the box together and adequate cutting means, resulting in greater overall encumbrance.

Another solution known in the art is described by U.S. Pat. No. 9,533,785, which however relates to an apparatus for manipulating cardboard boxes in the technical field of the packaging industry, without any connection with the sector of systems to ship objects.

U.S. Pat. No. 9,533,785 describes a conveyor that picks up the cardboard boxes in a flattened form and determines their opening during movement.

With reference to the present invention, a disadvantage of the solution described by U.S. Pat. No. 9,533,785 is given by the fact that the solution described by this document is not integrated into a system to box objects. For this reason, this document does not even describe the possibility of manipulating different cardboard box formats, let alone how to selectively select the desired format.

Therefore, there is the need to perfect a packaging system to pack, automatically or semiautomatically, objects of various types and dimensions inside boxes, which can at least overcome one of the disadvantages of the prior art.

Therefore, one of the objects of this invention is to provide a packaging system to pack objects of various types and dimensions inside boxes, wherein, at least the boxes are produced in the most automated manner possible, that is, without substantial intervention or with minimal intervention on the part of workers.

A further object of this invention is to form the box in an automatic manner and for this to occur quickly so that the box-forming operation can be carried out while the operator is filling a previous box, so that the new box will already be ready when the operator takes the batch of objects to be inserted in the box associated with a specific order.

A further object of this invention is to provide a packaging system to pack objects of various types and dimensions inside boxes, in such a way that the dimensions of the box are as small as possible, compatibly at least with the overall volume of the batch of objects that the box has to contain, which are associated with a certain purchase order, in order to reduce costs and volumes and not waste material.

A further object of this invention is a packaging system to pack objects of various types and dimensions inside boxes, that has reduced encumbrance, is simple, safe and reliable.

In order to overcome the disadvantages of the prior art and to obtain these and additional objects and advantages, the Requesting Party has studied, tested and devised this invention.

SUMMARY OF THE INVENTION

This invention is presented and depicted in the independent claim. The dependent claims present other features of this invention or variants of the main solution idea.

ILLUSTRATION OF THE DRAWINGS

These and other aspects, features and advantages of this invention will appear clear from the following description of embodiments, provided by way of example, which are not limiting, with reference to the attached drawings wherein.

It is specified that in this description the expressions and terminology used, such as, for example, the terms horizontal, vertical, anterior, posterior, high, low, inside and outside, with their declensions, have the sole function of better illustrating this invention with reference to the figures of the attached drawings and are not to be used in any way to limit the scope of the invention itself, or the scope of protection defined by the attached claims.

Moreover, persons skilled in the art will recognize that certain dimensions, or features, in the figures can be enlarged, deformed or shown in an unconventional manner, or not in a proportional manner, in order to provide a more readily understandable version of this invention. When, in the description below, dimensions and/or values are specified, the dimensions and/or values are provided exclusively for illustration purposes and must not be understood to be limiting of the scope of protection of this invention, unless these dimensions and/or values appear in the attached claims.

In order to facilitate understanding, identical reference numbers are use, when possible, to identify identical common elements in the figures. It is to be understood that elements and features of one embodiment can conveniently be combined or incorporated in other embodiments without additional clarifications.

DESCRIPTION OF SOME EMBODIMENTS OF THIS INVENTION

Reference will now be made in detail to the possible embodiments of the invention, of which one or more examples are illustrated in the attached figures as a non-limiting examples. Even the expressions and terminology used herein are for illustrative, not limiting, purposes.

Figure 1:
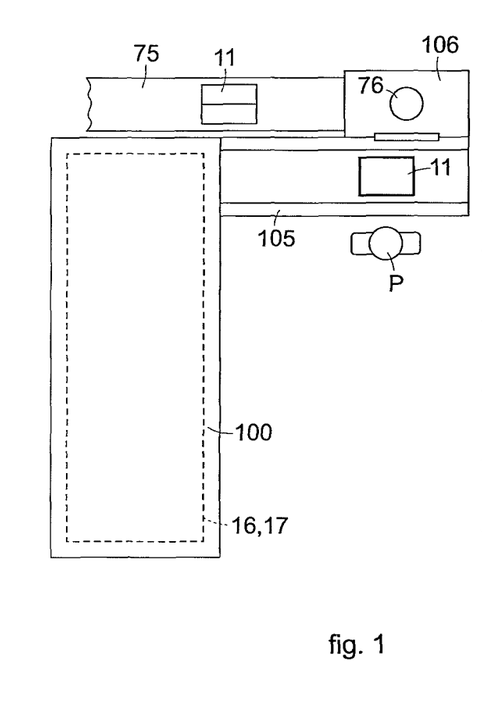
FIG. 1 is a schematic plan view of a packaging system, according to this invention.

With reference to FIG. 1, a packaging system 10 according to this invention, to pack one or more objects 101 of various types and dimensions in boxes 11, comprises:

a supply station 104 where the objects 101, even if only one object, are brought together in batches, or sets, the objects being part, for example, of a same purchase order, or to be sent to a same recipient;

an insertion station 105, where the objects 101 of each batch are inserted, manually or automatically, in a specific box 11 optimally sized on the basis of the dimensions and volume of the batch to be contained;

a closing station 106 to close the boxes 11 after the objects 101 have been inserted in them;

at least one storage unit 16, 17 defined by a fixed structure having a plurality of seatings 24, each seating 24 of said plurality of seatings being configured to house a respective group of folded and flattened cardboard boxes 12 of different dimensions, each folded and flattened cardboard box 12 having side 113, 114 and front 114, 116 panels joined together, each group being placed on a corresponding supporting surface 29; and a forming apparatus 100 configured to carry out both an automatic pick-up of a corresponding folded and flattened cardboard box 12 from the at least one storage unit 16, 17, and a subsequent automatic forming of the box 11 that will be filled in the insertion station 105.

The forming apparatus 100, supply station 104, insertion station 105 and closing station 106 and the at least one storage unit 16, 17 will be described in greater detail below.

In accordance with the invention, the packaging system 10 also comprises a control unit 120 configured to acquire information on the dimension of a batch to be introduced into the box 11 and to correlate it with a certain folded and flattened cardboard box 12 having the most appropriate dimension based on the acquired information on the size of the batch to be introduced into the box 11.

Moreover, the forming apparatus 100 comprises a first pick-up device 33 and a second pick-up device 52 respectively slidably mounted on the fixed structure of the storage unit 16, 17 in order to slide along a respective linear path.

In particular, the first pick-up device 33 is configured to pick up, in a pick-up zone, a respective folded and flattened cardboard box 12, selecting it from the group of cardboard boxes that contains the folded and flattened cardboard box having the most appropriate dimension which has been determined by means of the control unit 120, and to take the picked up box into a transfer zone, in which the folded and flattened cardboard box 12 is transferred from the first pick-up device 33 to the second pick-up device 52.

Determining the most appropriate dimension is carried out by the central control unit 120 in such a way that the first pick-up device 33 each time picks up the folded and flattened cardboard box 12 which guarantees a volume that is closest to at least the volume of the batch to be introduced.

In accordance with the invention, the second pick-up device 52 is mobile between the transfer zone and a release zone, in which the box is released after it has been at least partly opened by means of a forming unit 34 configured to move the side and front panels away from each other, in such a way as to dispose them respectively facing each other, forming a tubular box 12a having a quadrangular section open on two opposite sides.

The forming apparatus 100 also comprises a bottom closing unit 67 (FIGS. 14a, 14b) configured to form a bottom on the tubular box 12a, so as to form a box having a bottom wall, two front walls formed with the front panels, two side walls formed with the side panels, the box being open at the top.

Preferably, the seatings are disposed in a shared transfer space 25 defined within the fixed structure of the at least one storage unit 16, 17, in such a way as to be in communication with each other through the shared transfer space 25.

In this case, the first pick-up device 33 is preferably sized and configured to remain in the shared transfer space 25 when it moves along the respective linear path, from the pick-up zone to the transfer zone.

In the example shown, the at least one storage unit is made up of two storage units 16, 17 as above, both of which are mounted on a load-bearing structure 13. One of the two storage units, the first one (indicated by the number 16), is mounted on a, for example horizontal, flat surface S of the load-bearing structure 13 and the other storage unit, the second one (indicated by the number 17), is mounted on a flat surface Q, parallel to the flat surface S, above the first storage unit 16.

In other embodiments of this invention, the packaging system 10 can comprise one sole storage unit or a number of storage units greater than two.

Given the substantial similarity of the first storage unit 16 with the second storage unit 17, the description below will solely relate to a single storage unit 16.

In the example shown, the fixed structure on which the storage units 16, 17 are mounted consists of a shaped frame 18 (FIG. 5, FIG. 6 and FIG. 7) defining at least two uprights 19, a top panel 20 (FIG. 7), which is substantially horizontal, and a base panel 21, which together define a compartment 22. The compartment 22 and the shared transfer space 25 therefore define a space inside said frame 18.

Figure 3:
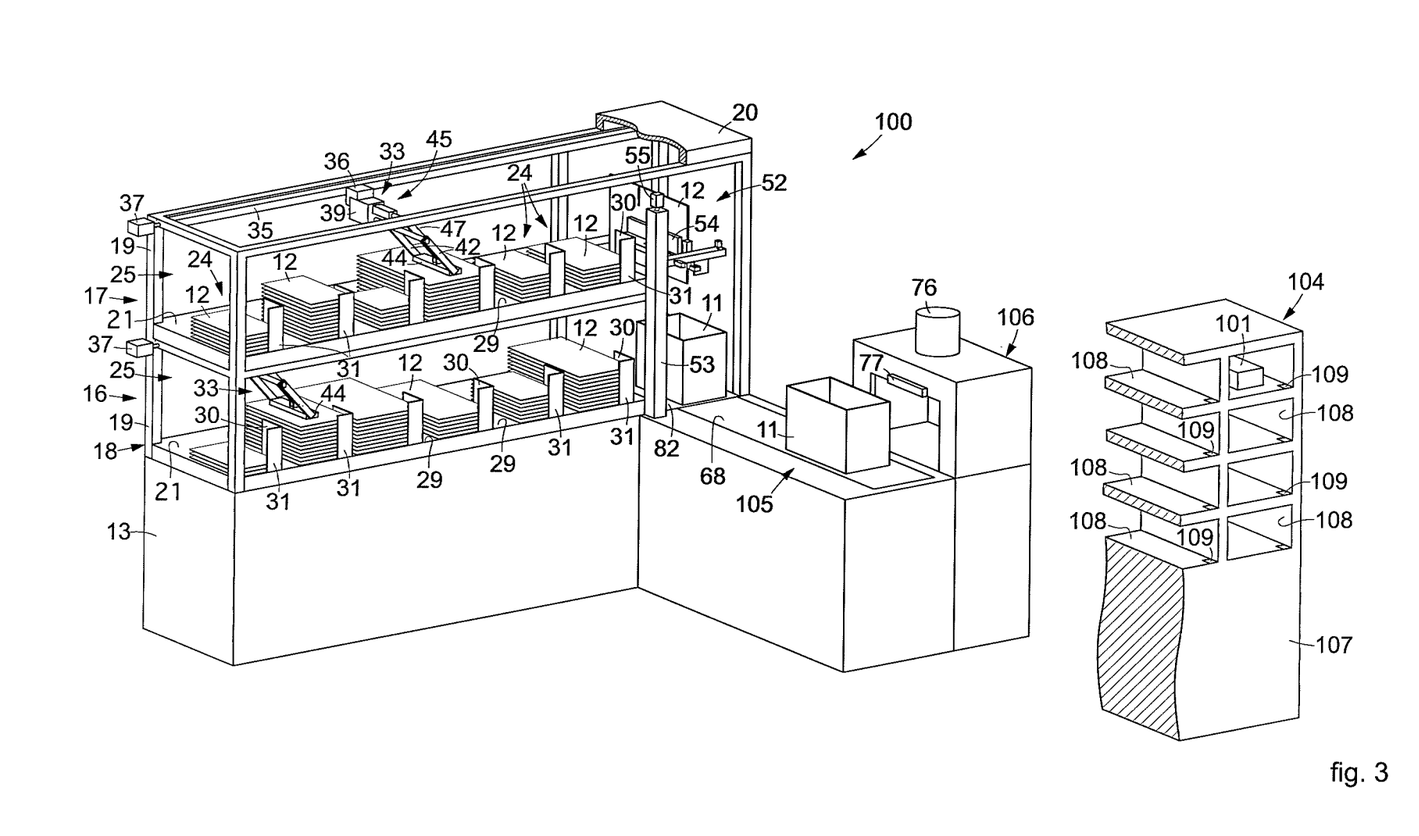
FIG. 3 is a schematic and partly sectioned three-dimensional view of the system of FIG. 1.

In particular, the plurality of seatings 24 is formed out of the base panel 21. Each group of folded and flattened cardboard boxes 12 is placed in the pertinent seating 24. Each seating 24 houses a group of folded and flattened cardboard boxes 12 having the same dimension but different from each other in relation to the dimensions of another group disposed in another seating 24, as shown, for example, in FIG. 3, FIG. 5 and FIG. 6.

Each seating 24 also has, in addition to the supporting surface 29 located at the bottom, a lateral supporting surface 30 substantially orthogonal to the supporting surface 29 and an abutment wall 31, which functions as an end-of-travel wall for the folded and flattened boxes 12 and which is substantially vertical. The folded and flattened boxes 12 are thus disposed on the lower supporting surface 29 in a reference position that can be repeated and is automatically recognizable. In particular, the manual or automatic operator loading folded and flattened cardboard boxes 12 in each seating 24 pushes them until they abut against the abutment wall 31 and against the lateral supporting surface 30. In this way, all the folded and flattened cardboard boxes 12 are flush with this abutment wall 31 and therefore the position of their panels will be known a priori.

In this manner, once the folded and flattened cardboard boxes 12 have been inserted in the seating 24, they are stacked and can be disposed lying down, as shown in the example in the drawings, with their panels substantially parallel to the supporting surface 29.

As a whole, the seatings 24 of the first storage unit 16 and of the second storage unit 17 are disposed at different heights, for example, following a matrix with rows and columns, with the rows at different heights.

Each seating 24 is suitable to contain a congruous number of folded and flattened cardboard boxes 12 of the same dimensions, for example standardized, each of which can be used to make a box 11 with a predeterminate internal volume.

In possible embodiments, the seatings 24 can be equipped with sensors configured to detect and verify a fill level of the folded and flattened cardboard boxes 12 in the seating 24 and provide a correlated signal, for example useful for the purposes of re-stocking new folded and flattened cardboard boxes 12.

Furthermore, the aforementioned seatings 24 have a loading opening, for the loading of the cardboard boxes 12, and possibly a pick-up opening, opposite the loading opening.

In the example shown, the shared transfer space 25 extends at least partially in a zone that is placed above the plurality of seatings 24.

In practice, the shared transfer space 25 is between the seatings 24 and the upper wall 20 of the frame 18 and it is sized in such a way to allow the first pick-up device 33, when it moves from the pick-up zone to the transfer zone, to pass above the seatings 24 without interfering with the folded and flattened cardboard boxes 12 placed therein, while remaining inside the compartment 22.

According to one aspect of this invention, each box 11 is automatically formed by the forming apparatus 100 starting from the folded and flattened cardboard boxes 12 (FIG. 3), with each one of which it is possible to form a box 11 having defined dimensions, as regards width and length.

Figure 12:
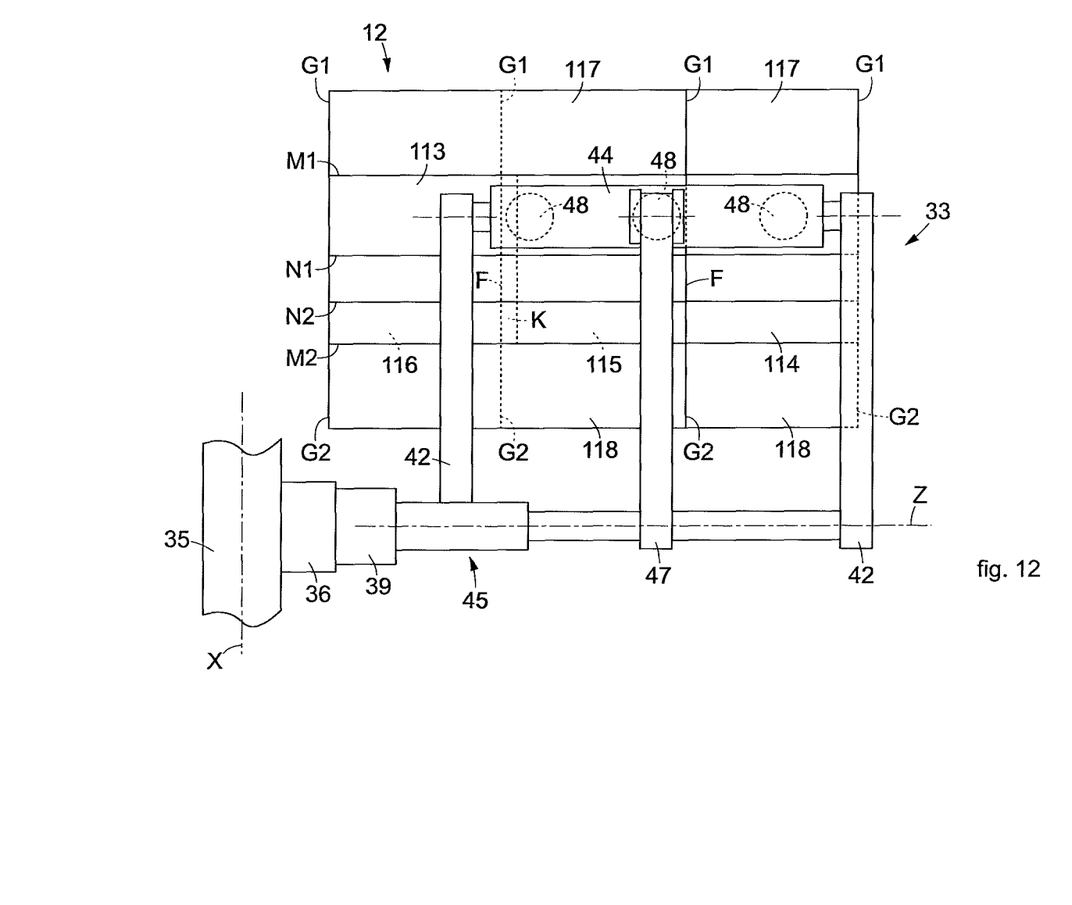
FIG. 12 is a left side view of an enlarged detail of the forming apparatus of FIG. in the operational phase shown in FIG. 8.

For example, each folded and flattened cardboard box 12 (FIG. 12) comprises a sheet, which is folded and glued with a tab, or flap, K in order to form two overlapping layers when the box is folded; each layer consists of a respective side panel 114 or 116 and front panel 113 or 115 which are joined to each other along a respective folding line F.

Figure 4:
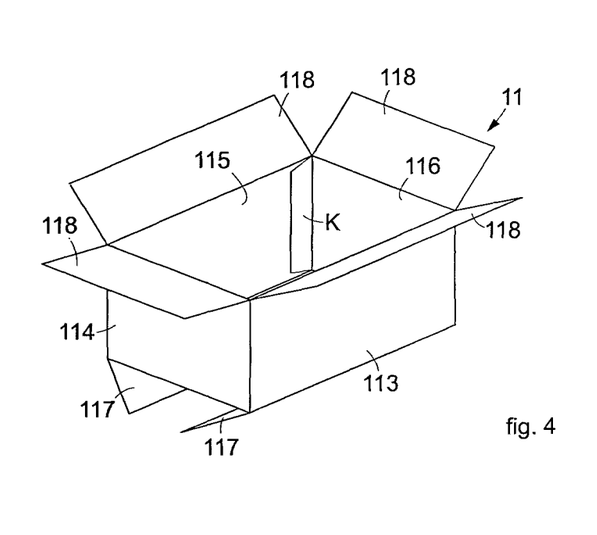
FIG. 4 is a three-dimensional view of a box usable by the system of FIG. 1.

By moving the two layers away from each other, the cardboard box takes the shape of the tubular box 12a (FIGS. 13c, 14a and 14b) with a section that is quadrangular and open on two opposite sides, where the front panels are facing each other and distanced and the side panels are facing each other and distanced. Each panel comprises first cuts G1 (FIG. 12) which define four bottom flaps 117 (two of which are on the front when looking at FIG. 4), suitable to form, by folding along a first crease line M1 (FIG. 12), the bottom, or bottom wall, of the box 11, and second cuts G2 (parallel to G1) which define four top flaps 118 (two of which are on the front when looking at FIG. 12), suitable to form, by folding along a second crease line M2 (parallel to M1), the top wall, or closing wall, of the same box 11. Moreover, there can optionally be one or more additional crease lines N1, N2 (which are parallel to the first and second crease line M1, M2), so that it is possible to select at which height the folding of the top flaps 118 must be made in order to close the box 11. Therefore, with a same folded and flattened cardboard box 12 it is possible to produce a shaped box 11 with a height and therefore a capacity that can be selected by the user, as a function of the crease line in correspondence with which the folding of the top flaps 118 will occur.

Such folded and flattened cardboard boxes 12 are also called "flattened pre-glued boxes" in the sector.

As previously seen, each purchase order identifies the objects 101 that a customer has purchased at a specific moment, which together define a same batch of objects 101, which will be inserted in a box 11 of an appropriate dimension, which, according to an aspect of this invention, is automatically formed by the forming apparatus 100 depending on the volume of the batch of objects 101 to be inserted into it.

According to a preferred embodiment of this invention, the first pick-up device 33 is operable with at least two degrees of freedom, a linear movement, along said linear path which the pick-up device performs when it moves from the pick-up zone to the transfer zone, and a rotation, the function of which will be described in greater detail below.

The fixed structure of the storage unit 16 comprises a rectilinear first sliding guide 35 to which the first pick-up device 33 is slidably associated, which slides along this first sliding guide 35 to move from the pick-up zone to the transfer zone.

In the example shown, the first sliding guide 35 extends horizontally and is fixed to the top part of frame 18, inside the compartment 22 (FIG. 7) and substantially extends lengthwise from one part to the other of the compartment (FIG. 5), which is to say parallel to the base panel 21, along a longitudinal, or horizontal axis X.

A first carriage 36 is slidably mounted on the first sliding guide 35, which carriage is connected, by known means of connection and which are not represented in the drawings, to a first electric motor 37 configured to selectively make the first carriage 36 slide in the two directions, that is to the right or to the left, parallel to the longitudinal or horizontal axis X.

The first pick-up device 33 is mounted on the first carriage 36 to move together with it along the rectilinear first sliding guide 35.

The rotation of the first pick-up device 33 is enabled by a rotating drive member 45 (FIG. 7) configured to rotate the first pick-up device 33 around an axis of rotation Z, preferably perpendicular to the linear path that the first pick-up device 33 completes in going from the pick-up zone to the transfer zone.

The first pick-up device 33 comprises a first gripping element 44 provided with one or more first gripping suction cups 48 configured to stably take a folded and flattened cardboard box 12 from one of the stacked groups of folded and flattened cardboard boxes 12 stacked in the seatings 24.

The first gripping element 44 consists of an arm that extends transversally with respect to the first sliding guide 35.

When in operation, in order to establish a stable coupling between the first gripping element 44 and the folded and flattened cardboard box 12 to be picked up, a vacuum pump, of a known type and not represented in the drawings, is driven, said pump, connected to the first gripping suction cups 48, being capable of generating a vacuum or a low pressure between them and an outside surface of the folded and flattened cardboard box 12 to be picked up.

In the example shown, the first gripping element 44 can make a vertical movement which is achieved by combining the movement of the first carriage 36 on the first sliding guide 35 with the rotation around the axis of rotation Z obtained by means of the actuator 45.

For the purpose of keeping the picked-up folded and flattened cardboard box 12 in a horizontal state during the lifting from the seating 24, the first pick-up device 33 comprises an articulated parallelogram system, which allows to prevent the first gripping element 44 from rotating (and with it, the folded and flattened cardboard box 12 which is held by the first gripping suction cups 48) when the first pick-up device 33 is driven in rotation around the axis Z.

In the example shown, the drive member 45 of the first pick-up device 33 comprises a support 39 (fixed to the carriage) and a pair of arms 42 hinged to it, to which in turn the aforementioned first gripping element 44 is connected (at the opposite end). Moreover, a drive lever 47 is provided which is also connected to said first gripping element 44 and driven in rotation around the axis of rotation Z, to lift and lower the first gripping element 44.

In these embodiments, this vertical movement is necessary in order to pick up the folded and flattened cardboard box 12 from the seating 24 and to lift it before taking it into the transfer zone where it is transferred to the second pick-up device 52.

This second pick-up device 52 is slidably associated with a second sliding guide 53 fixed onto the fixed structure of the storage unit 16 in order to slide, along the respective linear path, between the aforementioned transfer zone and a release zone, in which the tubular box 12*a* is released at least partly formed starting from the folded and flattened cardboard box 12.

In the example shown, the second sliding guide 53 extends vertically.

A second carriage 57 is mounted sliding on the second sliding guide 53, and said carriage is connected, by means of known connection means which are not represented in the drawings, to a second electric motor 55 configured to make the second carriage 57 slide, in the two directions, which is to say downward and upward.

The second pick-up device 52 is mounted on the second carriage 57 to move along the second sliding guide 53.

In the example shown, the second pick-up device 52 comprises a second gripping element 54 which extends within the shared transfer space 25.

In particular, the shared transfer space 25 is in communication with a space obtained on the side, in order to allow the second pick-up device 52 to freely move vertically.

In essence, this shared transfer space 25 does not only occupy a zone above the seatings 24 but also a side zone, wherein in the example shown, the side zone extends upwards putting the two superimposed storage units 16, 17 in communication.

This second gripping element 54 is provided with one or more second gripping suction cups 56 configured to stably hold the folded and flattened cardboard box 12 transferred from the first gripping element 44 of the first pick-up device 33.

In practice, the folded and cardboard box 12 is delivered by the first gripping element 44 to the second gripping element 54.

The second gripping element 54, for example, consists of an arm that extends transversally with respect to the second sliding guide 53.

In order to establish a stable coupling between the second gripping element 54 and the folded and flattened cardboard box 12, a vacuum pump, of a type known in itself and not represented in the drawings, is activated and is connected to the second gripping suction cups 56, and is capable of generating a vacuum, or low pressure, between them and an external surface of the folded and flattened cardboard box 12, which surface is opposed to the surface coupled to the first gripping element 44.

In embodiments, the second pick-up device 52 is mounted on the second carriage 57 in order to be able to move in a horizontal translational manner. This horizontal translation movement is achieved by means of a translation device 58, for example, made by means of a wound-up strap 58a, driven by a third electric motor 59.

Figure 5:
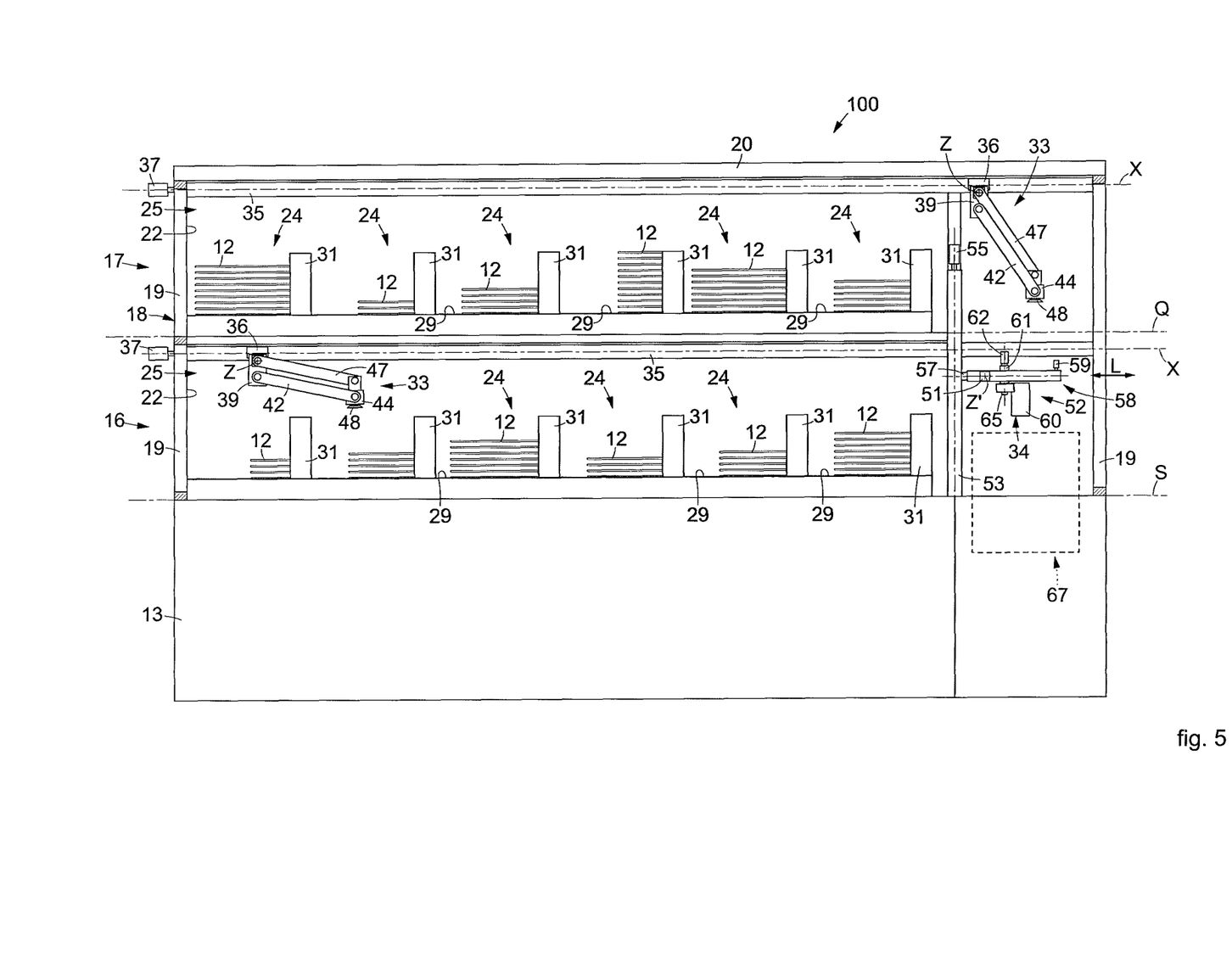
FIG. 5 is a front view of a forming apparatus of the system of FIG. 1.
Figure 6:
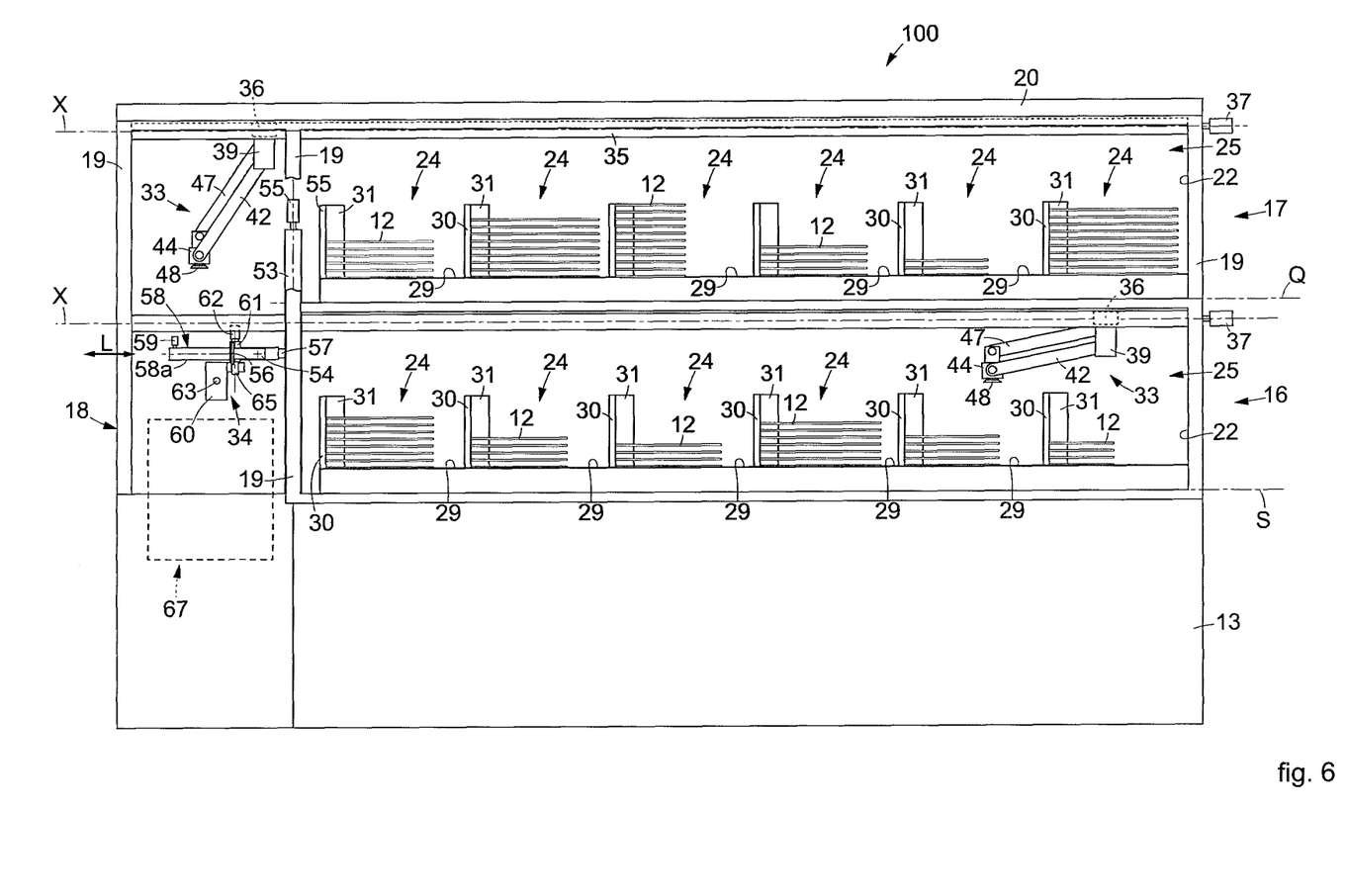
FIG. 6 is a rear view of the forming apparatus of FIG. 5.
Figure 7:
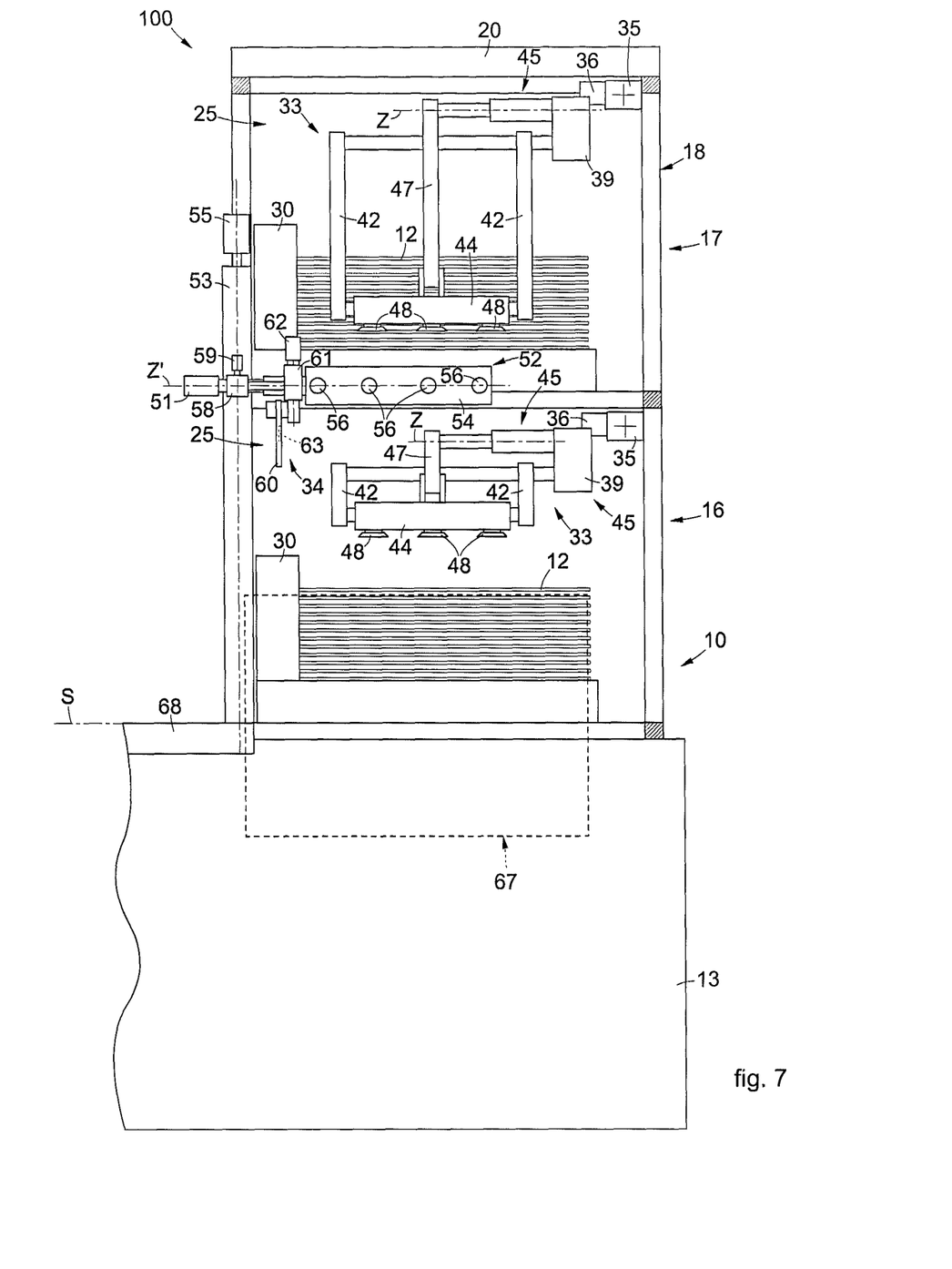
FIG. 7 is a partial cross-sectional left side view of the forming apparatus of FIG. 5.
Figure 8:
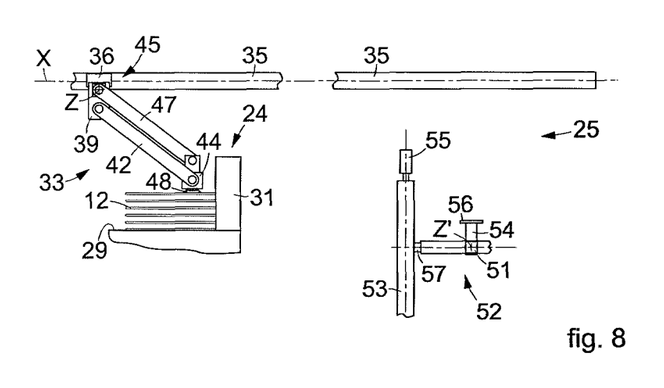
FIG. 8 to FIG. 11 are schematic representations of some operational phases of the forming apparatus of FIG. 5.
Figure 10:
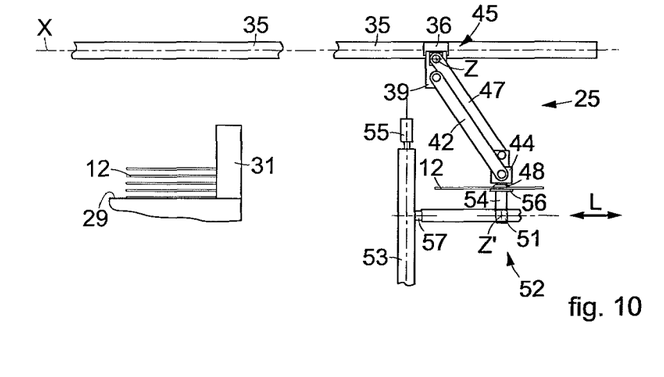
Figure 11:
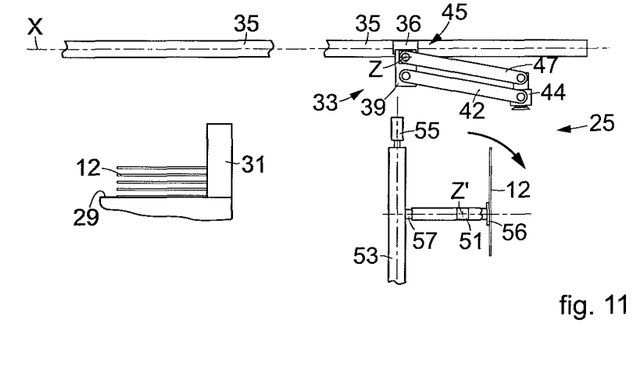

In particular, the second pick-up device 52 is configured to be able to carry out an alternating linear movement in a direction that is substantially parallel to the aforementioned longitudinal, or horizontal axis, X, as schematically indicated by the bidirectional arrow L in FIG. 5, FIG. 6 and FIG. 10.

This horizontal movement of the second pick-up device 52 allows for the position of the second gripping element 54 to be adjusted, in such a way as to achieve a stable grip of the folded and flattened cardboard box transferred by the first gripping element 44, this regardless of the dimension of the folded and flattened cardboard box 12.

According to the embodiment shown, the second pick-up device 52 can be made to rotate with respect an axis of rotation Z' that is parallel to the axis of rotation Z of the first pick-up device 33, for example, by means of a respective electric motor 51.

This rotating movement of the second pick-up device 52 allows for variation of the orientation of the folded and flattened cardboard box 12, for example, from horizontal to vertical.

The forming unit 34 opens the folded and flattened cardboard box 12 after it has been transferred to the second pick-up device 52.

In the example supplied here, the forming unit 34 is mounted on the second pick-up device 52 and is therefore integrally mobile therewith.

In particular, the forming unit 34 is supplied with one or more rotating lever elements 60 having one or more gripping portions 63 configured to couple with the flattened carton and form, by means of rotation, a tubular box 12a. In the embodiment described here, the rotating lever element 60 (FIG. 13a, FIG. 13b, FIG. 13c) is mounted in a rotatable manner on a support block 61, by means of a spindle 65. The support block 61 is in turn disposed at an end of the second gripping element 54. The rotating lever element 60 is controlled in rotation by a fourth electric motor 62.

Figure 13A:
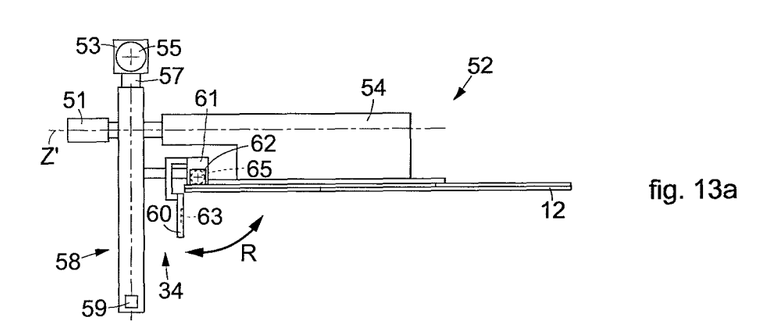
FIG. 13a, FIG. 13b, FIG. 13c are schematic plan views of a forming device of the forming apparatus of FIG. 5 in different operational conditions.
Figure 13B:
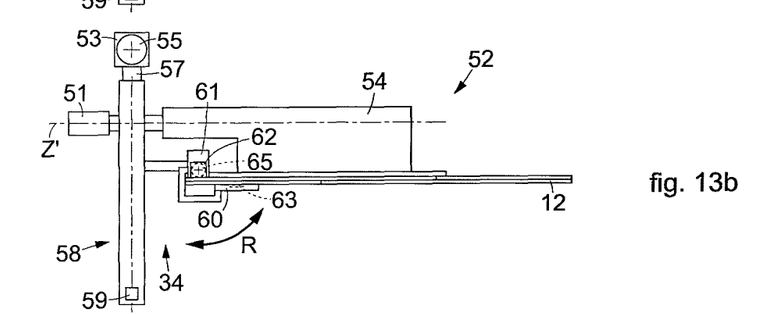
Figure 13C:
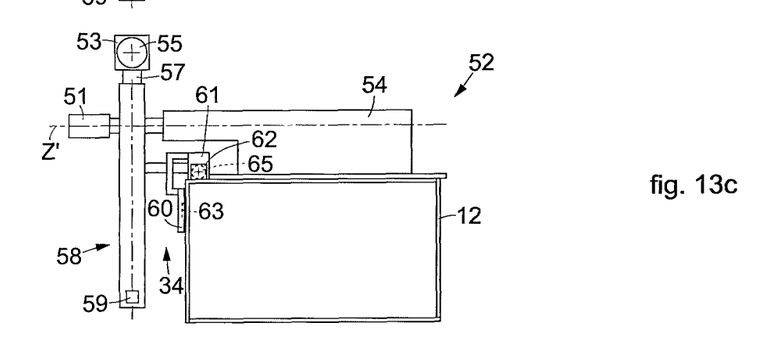

Once coupled to the folded and flattened box 12, the gripping portion 63 rotates a wall of the latter, as indicated by arrow R in FIG. 13a, FIG. 13b, FIG. 13c and brings about an open three-dimensional condition forming the tubular box 12a as above (see operating sequence of FIG. 13a, FIG. 13b, FIG. 13c). The gripping portion 63 can, for example, be a pick-up suction cup driven by a vacuum pump, not represented in the drawings, to generate a vacuum.

The rotating lever element 60 is configured to pass, while rotating, from a starting position, in which it is distanced from the folded and flattened cardboard box 12 (FIG. 13a) which is held by the second gripping element 54, to a coupling position (FIG. 13b), in which it is in contact with the folded and flattened cardboard box 12 which has been picked-up and is kept suspended by the second gripping element 54. In this coupling position, the activation of the gripping portion 63 combined with a new rotation of the rotating lever element 60 from the coupling position to the starting position (FIG. 13c) brings about the opening of the folded and flattened box 12 by virtue of the articulation its walls around the respective folding lines so as to form the tubular box 12a.

Naturally, during the rotation of the rotating lever element 60, the carton remains held, on the opposite face, by the second gripping element 54.

The second gripping element 54 transports the folded and flattened box 12 toward the closing unit 67, where the forming unit 34 forms the tubular box 12a starting from the folded and flattened box 12 before the bottom is created.

The closing unit 67, which can be of any known type, is configured to rotate the four bottom flaps, thus creating the bottom, then, the box 11 with the closed bottom is moved by means of transport 68 (FIG. 1, FIG. 3), toward the insertion station 105 (FIG. 1), in which the manual or automatic insertion of the objects 101 to be packed is provided.

During the translation toward the insertion station 105, the bottom flaps 117 that form the bottom are stabilized, for example, by means of adhesive tape, or the application of glue, so as to thus form the bottom of the box 11 in a stable manner.

Figure 14A:
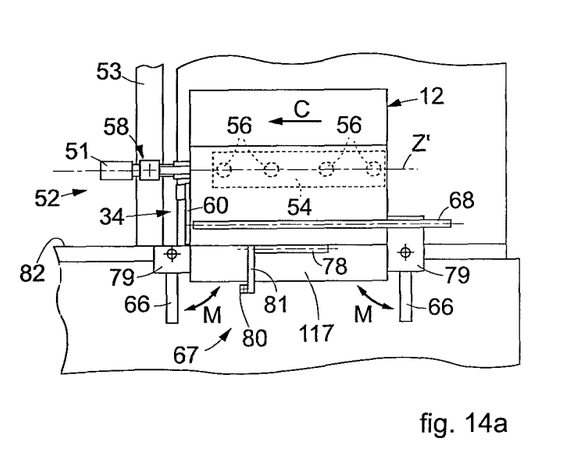
FIG. 14a, FIG. 14b are schematic side and front views of a box bottom closing unit of the forming apparatus of FIG. 5.
Figure 14B:
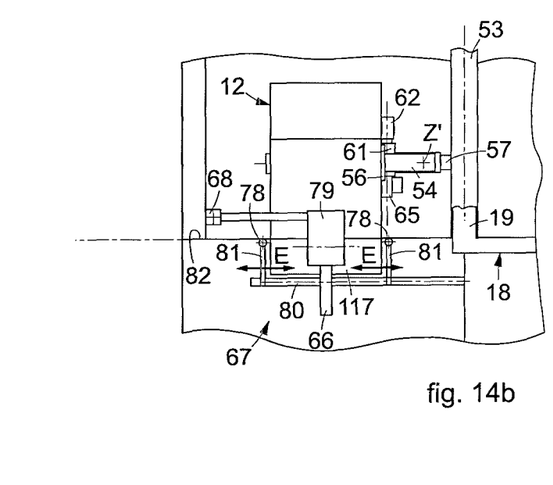

In greater detail, the closing unit 67, represented schematically in FIG. 14a and FIG. 14b, comprises, for example, a pair of rotating levers, or folding devices, 66 disposed opposite each other to make two respective opposite bottom flaps 117 of the box rotate (arrows M in FIG. 14a). Each rotating lever 66 is mounted on a respective support block 79. One of the two support blocks 79 is coupled to the aforementioned means of transport 68 which can be, for example, straps or the like, this to bring about advancement along a sliding surface 82 (arrow C in FIG. 14a). In the case in point, the support block 79 that brings about advancement is the rear one, therefore working as pusher together with the means of transport 68. Alternatively, the advancement can be carried out using small bands.

The rotating lever 66 mounted on the support block 79 coupled to the means of transport 68 allows for adaptation to the dimensions of the box, now in the form of a tubular box 12a and, in particular, to process boxes of various lengths. The closing unit 67 also comprises a pair of opposing rods 78, linearly movable between the two positions, near and distant (FIG. 14b), to bring about the rotation and folding of the remaining two opposite bottom flaps 117 (arrows E in FIG. 14b). In particular, each opposing rod 78 is associated with a transverse movement guide 80 by means of a related support 81.

After the folding of the first two bottom flaps 117 by the pair of rotating levers 66, the action of the pair of opposing rods 78 is provided, which rods are moved one toward the other to fold the second pair of bottom flaps 117. After which, the box 11 with the closed bottom is moved by the means of transport 68 toward the insertion station 105.

Alternatively, the rotating levers 66 can be elements bringing about a translation.

The closing unit 67 can be provided with adhesive tape applicators, for example, a roller applicator or the like, to apply the closing tape on the bottom wall once the second pair of bottom flaps 117 has also been rotated. The application of said adhesive tape can be readily carried out while the box 11 is transported by the means of transport 68 toward the insertion station 105. In the event a tape application group is provided, the group is favorably configured in such a way to apply the tape centered along the center line of the box 11. The adhesive tape can be a water activated adhesive. Alternatively, it is conceivable to provide dispensation of a glue prior to the closure of the second pair of bottom flaps 117.

Figure 15:
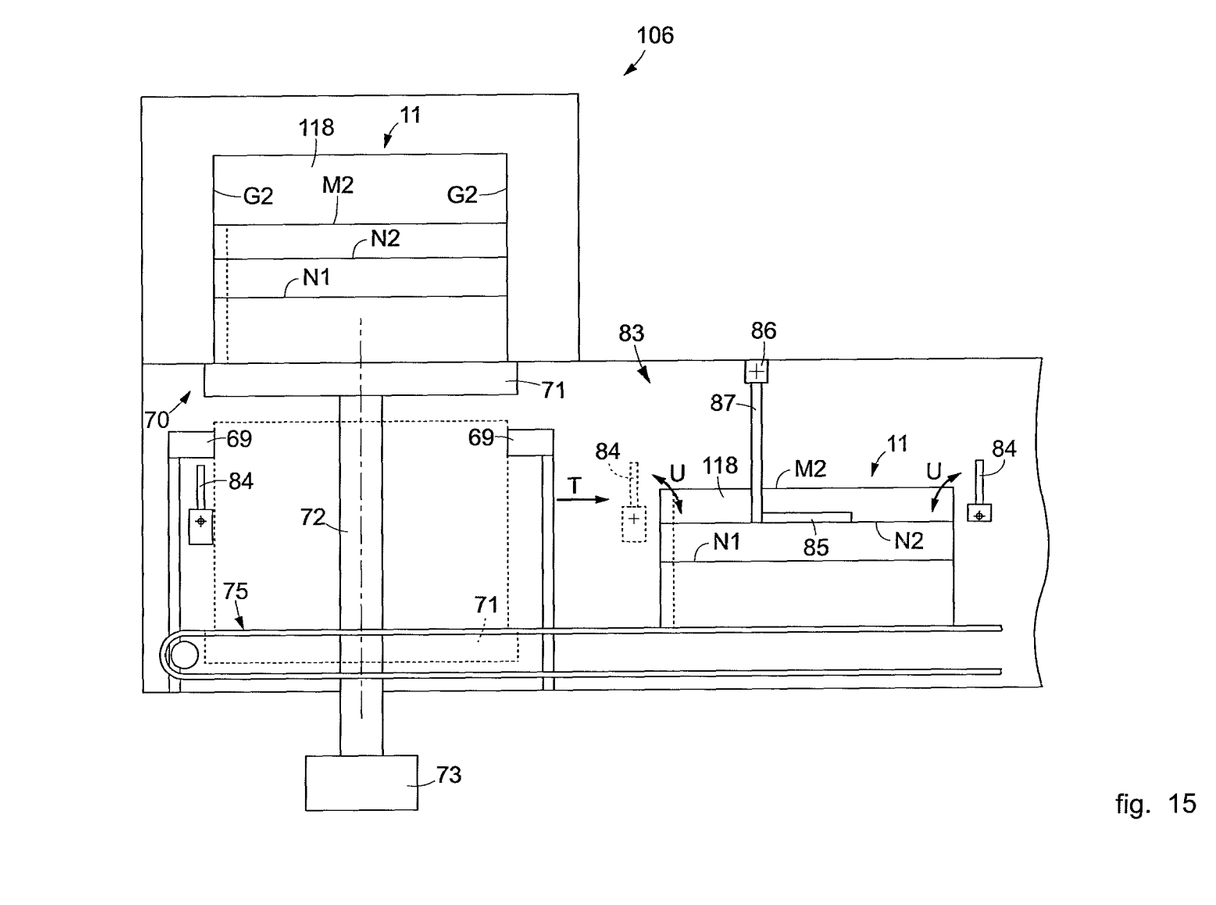
FIG. 15 is a schematic front view of a closing station of the system of FIG. 1.

Advantageously, it is possible to move the second gripping element 54 and the associated forming unit 34 horizontally and in a selective manner thanks to the translation device 58, consequently also translating the tubular box 12a, in order to adapt to the dimensions of the latter for the purposes of the subsequent operation for the closing of the bottom flaps 117, in particular, to favor the positioning of the closing tape that is centered along the center line of the box 11. Indeed in this manner, it is possible to process boxes 11 with a different width while maintaining their center line set with respect to the closing unit 67. In particular, it is possible to form boxes 11 of different widths while keeping, as a fixed reference, the center line of the box 11 where the tape is applied for the closing of the bottom wall, even if the boxes 11 have different widths. The closing station 106 is positioned close to the insertion station 105 (FIG. 1) and it is configured to receive the box 11 containing the objects 101 and to close its top part using the top flaps 118 (FIG. 15).

Optionally, the closing station 106 can comprise cutting members 69 configured to reduce the dimension of the box 11, in particular reducing its height, prior to closing its top part, for example, along one of the crease lines N1 or N2.

Advantageously, the insertion station 105 or the closing station 106 can present means 77 for the optoelectronic acquisition (FIG. 1 and FIG. 3) of the aforementioned box 11 and of the objects 101 it contains, for example, dimensions of box and of objects, in particular, at least the height of the box, for the purposes of the subsequent resizing of the aforementioned box 11 by means of the cutting members 69. The latter are configured to automatically cut parts of the aforementioned box 11 on the basis of the aforementioned optoelectronic acquisition signal.

In particular, the cutting members 69 are configured to lengthen the second cuts G2 in order to lengthen each top flap 118, so as to reduce the height of the box 11, as known in the art with the term "down-sizing".

The signal supplied by the aforementioned optoelectronic acquisition means 77 can also be used to verify if the insertion of the objects in the box 11 has occurred. If insertion of the objects has been verified, then the procedure allows for the formed box 11, and in which the objects have been inserted, to move forward toward the closing station 106. Additionally, the process advantageously also allows for advancement of a subsequent formed box 11 toward the insertion station 105.

Moreover, verification that no filling material protrudes from the box 11 can also be carried out by means of the optoelectronic acquisition means 77.

The closing station 106 can, moreover, comprise a vertical movement device 70, which comprises a horizontal support plate 71 that slides vertically on a rod 72, controlled by an actuator 73 between a raised position, represented with a continuous line in FIG. 15, in which each box 11 is found after the objects 101 have been inserted in it, and a lowered position, represented with dashed lines in FIG. 15.

After the box 11 has been filled with the objects, it is displaced into the lowered position by means of the vertical movement device 70 and it is directed, by means of a conveyor 75, in a direction indicated by the arrow T in FIG. 15, toward an additional closing device 83 to carry out the closing of the top flaps 118.

In the example shown, this additional closing device 83 comprises a pair of closing levers, or folders, 84 and a pair of opposing rods 85, here represented schematically and similar to those described using FIG. 14a and FIG. 14b, even though they act upon the top flaps 118. The closing levers 84 are selectively rotatable as indicated by the arrow U in FIG. 15. Moreover, a first lever 84 (on the left in FIG. 15) is also movable horizontally, in the direction of advancement T and a second lever 84 is in fixed position (on the right in FIG. 15). The fact that the first lever 84 is horizontally movable allows adaptation to the dimensions of the box 11 and, in particular, for the processing of boxes 11 of various lengths, similarly to the rotating lever 66 mounted on the movable support block 79 of which in FIGS. 14a and 14b. Moreover, the opposing rods 85 can also be movable transversally to the direction of advancement T by means of an additional transversal movement guide 86 they are associated with by supports 87.

Alternatively, the box is brought to a fixed distance from the additional closing device 83 making the conveyor 75 vertically movable.

In particular, after the action of the cutting members 69, for the purpose of height adjustment, the box 11 is made to advance toward the right in FIG. 15 by the conveyor 75, until the first lever 84, on the left in a continuous line and in the center in a dashed line in FIG. 15, and the second lever 84 are in position to fold a first pair of top flaps 118. After which, in this position of the box 11, the opposing rods 85 intervene to bring about the closing of two additional top flaps 118, concluding the sequential closing of all the top flaps 118, to then proceed with the application of the closing adhesive tape. In the event in which a closing tape application group is foreseen, it can be favorably configured as a movable group because, following the down-sizing operation, the position for application of the top tape might not necessarily be centered with respect to the center line of the box 11. Here too, it is conceivable, as an alternative, to dispense glue prior to the closing of the second pair of top flaps. After which, as stated, the closed box 11 is moved on in a definitive manner by an additional conveyor, that is not shown, which is transversal to the conveyor 75, and which preferably passes below storage units 16, 17 to be directed toward a warehouse, or a shipping station, of known type and not represented in the drawings.

In the embodiment described here, the insertion station 105 is advantageously placed in a position between the supply station 104 and the at least one storage unit 16, 17, using a horseshoe-shaped arrangement, in order to make the transfer of the objects 101 in the respective box 11 easier, for example, manually by an operator P.

The closing station 106 is disposed near the insertion station 105.

The supply station 104 is configured to contain, subdivided by batches, the various objects 101 to be packed into the boxes 11.

Figure 2:
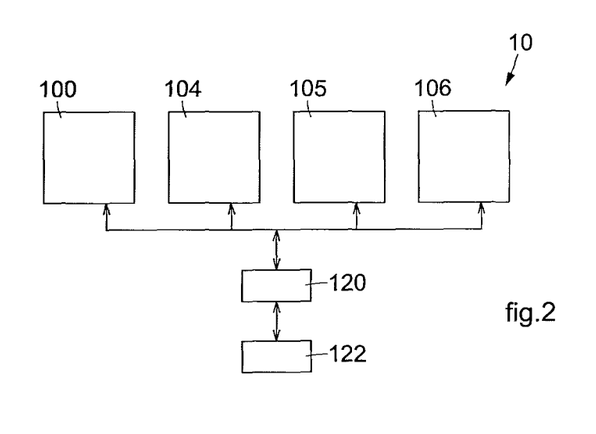
FIG. 2 is a block diagram of a control circuit of the system of FIG. 1.

The central control unit 120 (FIG. 2), preferably of a programmable type, commands the coordinated control of the forming apparatus 100 and of the stations 104, 105 and 106. The central control unit 120 can eventually be connected to a warehouse management system (WMS), which is, for example, run on a server 122, for the management of the purchase orders issued by a plurality of customers by means of any means of communication, for example, through the Internet.

In embodiments described here, the supply station 104 preferably comprises a temporary warehouse 107 (FIG. 3), having for example the shape of a shelving unit provided with a plurality of recesses 108, of the pass-through type, disposed, for example, in a matrix of rows and columns, with the rows being at different heights. Each recess 108 has an opening for loading, for example, placed on a wall of the temporary warehouse 107 (on the right in FIG. 1), from which the objects 101 can be inserted, and a pick-up opening, opposite the loading opening, easily accessible by an operator P in charge of the insertion station 105. In each recess 108, which has a horizontal supporting surface, the objects 101 of a same batch can temporarily be placed as they wait to then be inserted in the corresponding boxes 11 in the insertion station 105.

The loading of the recesses 108 with the objects 101 can be carried out both manually and automatically, for example, picking up the objects 101 themselves from another objects 101 warehouse, of known type and not represented in the drawings.

The temporary warehouse 107 and/or each recess 108 can be provided with at least one detection device 109 capable of detecting the presence and/or the volume of each of the objects 101 and/or of each batch of objects 101 in each recess 108.

The temporary warehouse 107 (FIG. 1) can, moreover, be provided with one or more display devices 111, of a known type, possibly placed in correspondence with each recess 108 to visually indicate on each occasion to the operator P in charge of the insertion station 105 which of the recesses 108 hold the objects 101 that are to be picked from the temporary warehouse 107 and inserted in the corresponding box 11. The aforementioned display devices 111 can also display the sequence with which the recesses 108 are to be unloaded by the operator P in charge of the insertion station 105 and which is synchronized with the automatic preparation sequence of the boxes 11 by the forming apparatus 100.

Favorably, the preparation of the box 11 takes place in a manner that is synchronized and sequential to the completion of the batch of objects of the order. There can be multiple complete batches in the temporary warehouse 107 and, according to this invention, it is foreseen to sequentially start forming the first box 11 and, in the temporary warehouse 107, the associated batch of objects to be inserted in the box 11 under preparation when the box 11 itself is ready will be indicated or displayed. Contemporaneously, the forming of box 11 for the subsequent order will start. Said last box 11 will remain in the storage unit 16, 17 until the preceding box 11 has been completed.

In alternative embodiments of this invention, the supply station 104, instead of the temporary warehouse 107, can comprise a conveyor which conveys a plurality of containers each of which contains a different batch of objects 101, in an automatic and coordinated manner together with the forming of the boxes 11, toward the insertion station 105. In this case, this invention can provide for the information relating to the volume of the objects 101 to be packed and/or the dimensions of the box 11 to be processed and managed in such a way to give the necessary time for the pick-up and the sequential forming of the boxes 11, in particular, providing for a temporary accumulation warehouse, or buffer, of containers containing the objects 101 of each batch upstream of the insertion station 105.

The insertion station 105, or the closing station 106 can also comprise a filler material dispensing device 76 (FIG. 1 and FIG. 3) configured to insert filling material, for example, paper or air bags in the box 11, to occupy, at least partially, the space inside the box 11 that is not taken up by one or more objects 101.

The operation of the system 10 described up to here is as follows.

In a first phase, the various batches of articles 101, each belonging to a specific purchase order, are prepared in the supply station 104, separated from each other, and each batch is inserted in one of the recesses 108 of the temporary warehouse 107.

In a second phase, the forming apparatus 100 automatically prepares one box 11 at a time, starting from a folded and flattened cardboard box 12 selected, on the basis of the volume and shape of the objects 101 of the specific batch to be inserted in the box 11, from a plurality of different formats available.

In practice, the folded and flattened cardboard box 12 is picked up which, once opened, guarantees a volume that is not inferior to the volume of the batch to be inserted and which gets closest to the volume of the batch to be inserted.

The control unit 120 determines which folded and flattened cardboard box 12 has the most suitable dimension, according to the dimension information acquired for the batch to be inserted.

The first pick-up device 33 (FIG. 5 and FIG. 6) is moved along the first horizontal guide 35 to bring itself in the pick-up zone on the seating 24 from which the folded and flattened cardboard box 12 is to be picked up.

At this point, the first pick-up device 33 is driven to bring the first gripping element 44 in contact with the folded and flattened cardboard box 12. The first gripping suction cups 48 are driven into suction in order to stably couple the folded and flattened cardboard box 12 to the first pick-up device 33.

Advantageously, the first gripping element 44 is associated with the folded and flattened cardboard box 12 (FIG. 13) on both sides of the folding line F facing the first gripping element 44, and eventually in a region comprised between the crease lines M1 and M2, to avoid that the folded and flattened cardboard box 12 can open during the subsequent movement phases.

Figure 9:
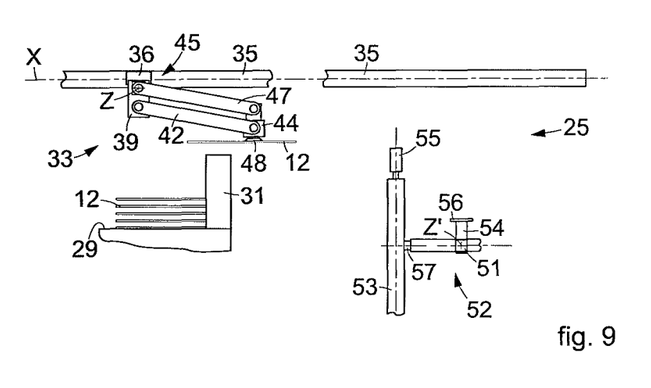

In particular, the folded and flattened cardboard box 12 is extracted from the seating 24 (FIG. 9), activating the rotating drive member 45 to obtain a movement of the first pick-up device 33 with a vertical component.

After having engaged the folded and flattened cardboard box 12, the first pick-up device 33 vertically lifts the first gripping element 44 to separate and remove the picked up folded and flattened cardboard box 12 from the remaining flattened cardboard boxes present in the seating 24.

The first pick-up device 33 is then moved on the first horizontal guide 35 along the shared transfer space 25 up to the transfer zone, where the folded and flattened cardboard box 12 is transferred to the second pick-up device 52.

During this movement from the pick-up zone to the transfer zone, the folded and flattened cardboard box 12 is kept in a configuration that is flattened, preferably along a horizontal surface, remaining in the shared transfer space 25.

The folded and flattened cardboard box 12 is then moved downward from the second pick-up 52 device toward the closing unit 67, driving the second carriage 57 along the second vertical guide 53.

Before proceeding with the closing of the bottom, the folded and flattened cardboard box 12 is opened by means of the forming unit 34 to make it take on a tubular shape, creating a tubular box 12a.

The opening of the folded and flattened cardboard box 12 takes place after the second pick-up device 52 has made the folded and flattened cardboard box 12 rotate from a horizontal position to a vertical position.

In a favorable manner, thanks to the translation device 58, even the second gripping element 54 can, moreover, alternatingly be translated horizontally from and toward the closing unit 67, as, for example, indicated by the arrow L of FIG. 5, FIG. 6 and FIG. 10, adapting itself to the width of the box 11 for the purpose of correctly centering the box 11 itself with respect to the application of the tape.

In this manner, the box 11 is produced automatically while a possible operator is free to carry out other actions, for example, packing, in the insertion station 105, another batch of objects 101 in another box 11 that was previously formed.

In a subsequent operational phase, in the insertion station 105 (FIG. 1) the prepared batch of objects 101 is inserted in box 11. Advantageously, with this invention, while the objects 101 of a batch associated with a specific order are inserted in the formed box 11, a new folded and flattened cardboard box 12 is picked up from the pertinent seating 24 in order to form another box 11.

In practice, the operator need only insert the objects of the batch associated with the specific order in the box 11, without worrying about forming the box 11, since the forming of the box 11 take place automatically and in an overlapping time period.

In this manner, advantageously, the idle times between the packing of objects 101 pertaining to one purchase order and the subsequent one are reduced, or even eliminated.

It is clear that modifications and/or additions of parts can be made to the packaging system described up to here, without going beyond the scope of this invention as defined by the claims. It is also clear that, even though the invention has been described with reference to specific examples, a person skilled in the art can achieve other equivalent packaging systems, having the features stated in the claims and therefore all falling within the scope of protection defined by them.

The invention claimed is:

1. A packaging method for packaging one or more objects in boxes, said method comprising:
    supplying one or more objects grouped into respective batches, each batch being associated with a respective purchase order;
    preparing a storage unit comprising a plurality of groups of folded and flattened cardboard boxes, of different dimensions, each folded and flattened cardboard box having two layers, each layer being formed by a respective side panel and front panel joined together;
    choosing, from the batches supplied, a batch to be inserted into the box, in accordance with a specific production time schedule;
    acquiring a dimension information of the batch to be inserted into the box;
    determining the folded and flattened cardboard box that has the most appropriate dimension based on the acquired dimension information of the batch to be introduced;
    picking-up, by means of a first pick-up device, a folded and flattened cardboard box, selecting the cardboard box from the stack of cardboard boxes that contains the folded and flattened cardboard box that has the most appropriate dimension that has been determined,
    moving said first pick-up device toward a transfer zone, in which the picked up folded and flattened cardboard box is transferred from the first pick-up device to a second pick-up device; subsequently:
    moving the second pick-up device with the folded and flattened cardboard box toward a release zone;
    manipulating, by means of a forming unit, the folded and flattened cardboard box that has been transferred, moving the side and front panels away from each other, so as to dispose them respectively facing each other, forming a tubular box that has a quadrangular section and is open on two opposite sides;
    closing, by means of a bottom closing unit, one of the two opposite open sides of the tubular box so as to form a box which has a bottom wall, two front walls formed with said front panels, two side walls formed with said side panels and which is open at the top, said closing step preferably being carried out in said release zone;
    moving the box open at the top toward an insertion station;
    inserting, in said insertion station, the selected batch of objects into said box open at the top;
    carrying out a final closure by closing the top opening of said box and
    transferring the closed box to additional processing stations, or toward shipment;
    wherein the determination of the most appropriate dimension is carried out in such a way as to pick up, each time, the folded and flattened cardboard box which guarantees a volume that is closest to at least the volume of the batch inserted.

2. The method according to claim 1, further comprising providing to synchronize an expected time for supplying a specific batch of one or more objects and the determining the folded and flattened cardboard box that has the most appropriate dimension, with the operations provided for picking up and subsequently opening the folded and flattened cardboard box picked up in order to form the box open at the top.

3. The method according to claim 1, wherein inserting one or more objects of a specific batch into the box open at the top is carried out in at least partial temporal overlap with one or more of the operations provided to pick up the subsequent folded and flattened cardboard box from said storage unit, and to form the tubular box.

4. The method according to any claim 1, wherein each folded and flattened cardboard box is disposed in the stack so as to make available to the first pick-up device a front panel and a side panel that are adjacent to each other and separated by a folding line, and wherein the pick-up is carried out by disposing the first pick-up device astride of said folding line applying a gripping force on both the panels separated by said folding line, so as to keep said folded cardboard box flattened during transport toward the transfer zone.

\* \* \* \* \*